United States Patent [19]

Aries et al.

[11] 4,444,600

[45] Apr. 24, 1984

[54] PROCESS FOR MAKING A SELECTIVE ABSORBER FOR A SOLAR COLLECTOR AND SELECTIVE ABSORBER OBTAINED

[75] Inventors: Lucien Aries, Montgiscard; Jean-Pierre Traverse, Ramonville-Saint-Agne, both of France

[73] Assignee: Agence Nationale de Valorisation de la Recherche (A.N.V.A.R.), Paris, France

[21] Appl. No.: 486,959

[22] PCT Filed: Jul. 2, 1982

[86] PCT No.: PCT/FR82/00113

§ 371 Date: Mar. 3, 1983

§ 102(e) Date: Mar. 3, 1983

[87] PCT Pub. No.: WO83/00169

PCT Pub. Date: Jan. 20, 1983

[30] Foreign Application Priority Data

Jul. 8, 1981 [FR] France ................. 81 13815

[51] Int. Cl.³ ................................. C23F 7/24
[52] U.S. Cl. ................................. 148/6.24; 128/901
[58] Field of Search ................. 148/6.24; 126/901

[56] References Cited

FOREIGN PATENT DOCUMENTS 53-37151 4/1978 Japan .................. 148/6.24
53-34651 9/1978 Japan .................. 126/901

Primary Examiner—Sam Silverberg
Attorney, Agent, or Firm—Harold H. Dutton, Jr.

[57] ABSTRACT

The invention concerns a fabrication process for a selective absorber of a solar collector to achieve a solar-radiation collection-surface with high absorptivity and low emissivity.

The collector surface is made of an iron alloy containing chrome and is immersed in an acid bath containing oxygen atoms and at least one metalloid substance based on sulfur, selenium and/or tellurium; beforehand, the state of the collector surface is adjusted for activation.

11 Claims, 1 Drawing Figure

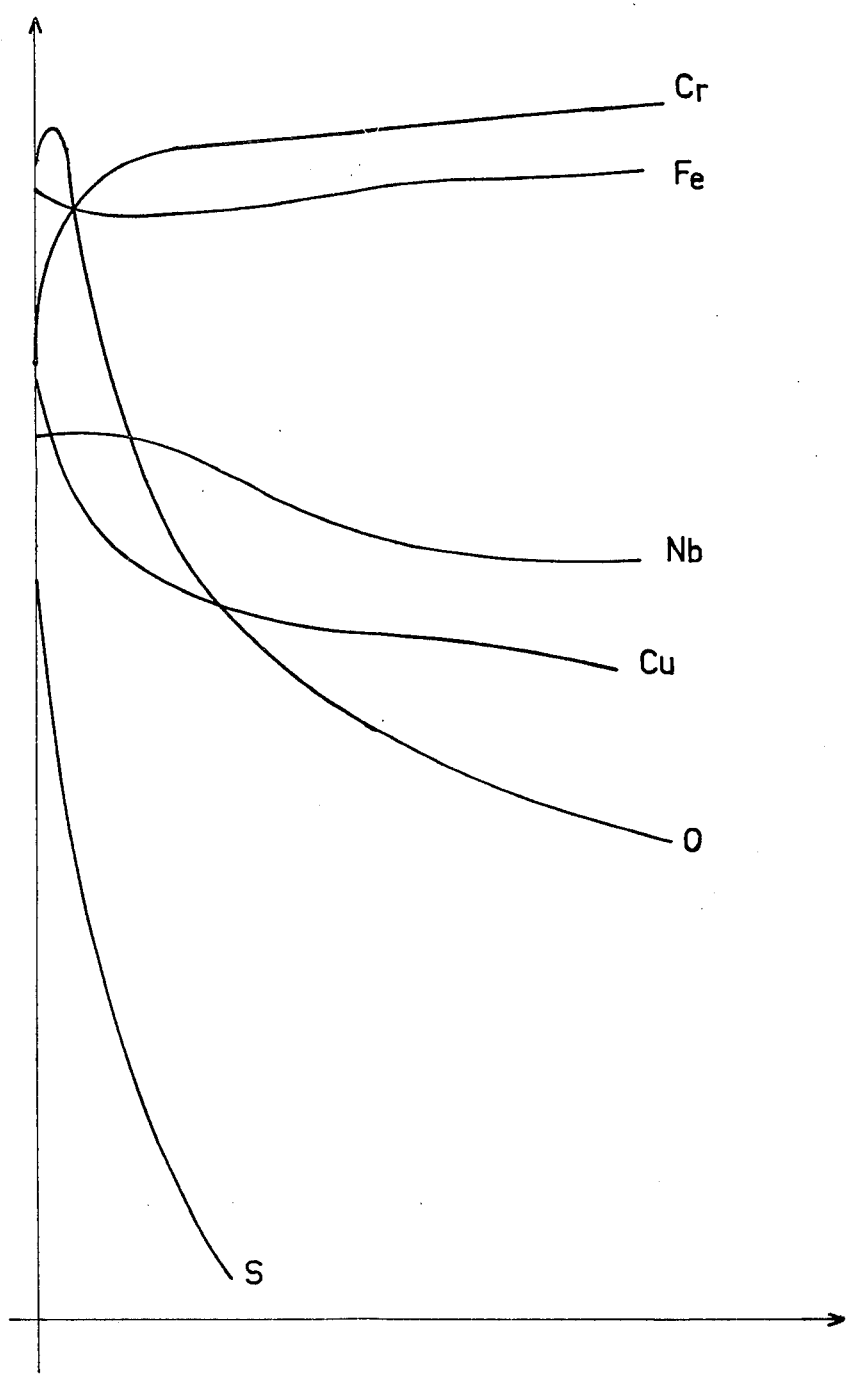

PROCESS FOR MAKING A SELECTIVE ABSORBER FOR A SOLAR COLLECTOR AND SELECTIVE ABSORBER OBTAINED

The invention concerns a process for fabricating a selective absorber for a solar collector achieving a collector surface for the solar radiation with high absorptivity and low emissivity; the invention extends to the selective absorbers for solar collectors thus obtained.

BACKGROUND AND OBJECTS

Several types of methods are known, consisting in coating the collector area of a solar absorber with a black deposit to increase the absorptivity and to reduce, where appropriate, the emissivity. One method presently used consists in coating the surface with an appropriate paint, but this method incurs several serious drawbacks. In the first place it results in a collecting surface at low selectivity or none, that is, with a high emissivity, so that a substantial part of the energy is lost by radiation, essentially within the infrared. Furthermore, these coatings degrade as a rule at moderate or high temperature (frequently starting at about 100° C.) after some time of service.

Another method provides for cathode depositions of chromium oxides, denoted as "chromium black", on the collector surface. The electrolytic bath is based on chromic acid and deposition is by conventional electrolysis, so that material is added to the surface. The drawback of this kind of method is the complexity and the cost of preparing the collector surface to be coated with chromium black: the surface requires nickeling beforehand to achieve good adhesion for the chromium-black coat and satisfactory selectivity. Moreover, a drop in absorptivity beyond moderate or high temperature (200° C.) is noted for surfaces coated in this manner.

Another kind of method, for instance illustrated in the French patent published as No. 2 325 002, uses stainless steel as the surface to be treated, this surface being treated chemically by immersing it while hot into complex baths containing chromium-based or lead-based compounds in order to form oxide films. This type of method suffers from the drawback of involving baths which are costly and polluting, and in resulting in oxide surface layers of which the thickness must be strictly controlled and monitored to achieve selectivity, and of which the stability is not assured at high temperatures.

Furthermore another method is known (French Pat. No. 2 337 320), consisting in forming on a metal surface a film composed solely of the metal sulfide of that surface, by initiating a surface reaction using sulfur or a sulfide; this method however results in a sulfur surface layer with poor physical-chemical stability; this is a very serious drawback considering the strenuous service conditions of the solar collectors (corrosive or humid atmosphere). Also, the optical properties obtained, in particular the selectivity, are relatively mediocre and vary in such methods.

All the above-described prior methods result in adding a deposit, a film, or a coating to the surface and adhering to it more or less firmly depending on the conditions of use.

On the other hand, the patent application No. 79 18414 in the name of the applicant describes a novel process treating the material itself to a given depth from the surface and making it possible to achieve selective absorption surfaces with excellent absorptivity and low emissivity while nevertheless enjoying the benefit of exceptional thermal stability. This process consists in performing a controlled anode oxidation of a chromium-containing iron alloy.

It is the object of the present invention to provide a novel process offering optical performance and thermal stability at least equivalent to those of the above process while also having the advantage of simplified implementation and totally or nearly totally eliminating the consumption of electric power.

Another object of the present invention is to substantially improve the physical-chemical stability of the absorption surfaces and in particular their stability in the presence of water.

Another object is to create an absorber which can operate within a range of high temperatures without thereby suffering a loss in selectivity; in particular it is the object of the invention to achieve collector surfaces suitable for use as solar collectors operating with semi-focused beams and/or operating in vacuum.

BRIEF DESCRIPTION OF THE INVENTION

To that end, the manufacturing process of the invention for a selective absorber of a solar collector achieving a collector surface of high absorptivity and low emissivity consists in making the absorber collecting-surface of an iron alloy containing chromium in the alloyed state, in preparing an acid bath containing oxygen atoms and in the dissolved form at least one metalloid substance based on sulfur, selenium and/or tellurium, in adjusting the state of the collector surface in such a manner that its natural corrosion potential in the presence of the above-cited bath be less than its primary passivation potential in order to raise the surface to the active state, and in causing metal atoms from the alloy to migrate, in causing metalloid atoms from the bath to migrate, in causing interface reactions between the elements, by placing the collector surface into the bath.

Accordingly the process of the invention calls for a chemical conversion treatment of the collector surface, resulting in a change in the chemical composition of a given surface thickness. The chromium, iron and any other alloyed metals migrate from the core of the material to the surface at specific speeds, while the metalloid substances and the oxygen from the medium migrate in the opposite direction to the material surface; within a given material thickness, these migrating atoms cause chemical reactions affecting the internal part of the material located in the immediate vicinity of the surface, thereby creating a complex medium shown by analysis to contain the metal elements in various oxidized states in different combinations with the metalloid substance(s) of the bath. A complex diffusion mechanism of certain metal elements toward the bath is also observed.

The thickness which is affected by the above-cited migrations and reactions is continuous with the core of the material without any addition or deposit of film. Experiment has shown that such an absorption surface offers both excellent optical properties, excellent physical-chemical stability and remarkable thermal stability as evidenced by the optical performance being kept up, and even improved, up to 300° C. (in air). Therefor the process of the invention makes possible solar collectors operating with semi-focused solar beams.

Furthermore tests in vacuum at temperatures of about 400° C. have shown that the optical properties of the surface are retained for several hours; accordingly these surfaces are also suitable for use in vacuum-sealed, tube-enclosed solar collectors (which must undergo such temperatures for several hours during manufacture).

In a particular simple and economical mode of implementation, an acid bath is used which contains water, especially an aqueous acid bath acting as the medium containing oxygen atoms.

To further improve the selectivity and the physical-chemical stability of the collector surface, it is especially advantageous to add to the acid bath a corrosion-inhibitor which is specific to the alloy and to the bath with its metalloid substance. Acetylenic alcohols and ethylenic alcohols in particular provide excellent results. These inhibitors optimize the rates of migration of the atoms and of the reactions taking place at the surface zone and they result in especially significant optical properties related to excellent physical-chemical stability, as will be shown below.

Furthermore, the iron alloy used advantageously can be a ferrite steel containing chromium, stabilized by the addition of niobium or titanium; surfaces prepared in this manner undergo no change at all after hundreds of hours within an aqueous medium, and this is a remarkable result.

Again other possible choices include an austenite steel containing chromium and nickel.

The metalloid substances added to the bath may consist of any sulfur, selenium or tellurium compound. In the light of the experimentation carried out so far, the best result appears to be provided by sulfur and preferably the substance placed in the bath shall be a sulfide or a thiosulfate.

Selenium also offers satisfactory results especially when used in the form of selenium dioxide or selenous acid.

It is mandatory that the bath pH be acid, but the precise value of this pH is not of primary significance. Practical baths shall contain at least 0.1% by weight of acid, for instance sulfuric acid, nitric acid, hydrochloric acid, acetic acid.

Furthermore, one of the essential conditions for achieving the above-cited migrations and reactions is the adjustment of the natural corrosion potential of the alloy immersed in the bath—a potential which mandatorily must be less than the primary passivation potential of said alloy. These potentials are well-known parameters to the expert, who knows how to measure them. (They characterize an alloy immersed in a given bath.)

As regards some alloys, in particular glossy-bright annealed alloys, this condition is inherently met by the alloy for the kinds of baths contemplated by the invention. In that case the adjustment of the natural-corrosion potential is merely a prior check that this condition is in fact being met.

As a rule, this adjustment will be advantageously implemented in the following manner:
  in the first place, by measuring this potential using a test circuit comprising an electrode consisting of collector surface and a reference electrode immersed in the bath,
  next, should the measured natural-corrosion potential exceed the primary passivation potential, by carrying out a cathode-activation operation by immersing an anode into the bath and in setting up a current between said anode and the collector surfaces in this case acting as the cathode,
  the above-cited measuring and cathode-activation steps being repeated until a natural-corrosion potential less than the primary passivation potential is obtained.

The above-described cathode activation causes a release of nascent hydrogen from the collector surface, said nascent hydrogen being highly reducing, so that the surface can be activated, that is, the alloyed metal can be stripped without surface oxides; the natural-corrosion potential of this surface therefore becomes very low (French sign convention), and accordingly the value can be lowered below the primary passivation potential, either in a single cathode-activation procedure lasting a few minutes, or, where called for, by two or several successive procedures with a check on the potential at the end of each.

Prior treatment stages may be applied to certain alloys and certain surface conditions to adjust the natural-corrosion potential: pickling, abrasion, degreasing. When this stage is over, the natural-corrosion potential is checked, and where necessary one or several cathode-activation procedures are performed.

DESCRIPTION OF PREFERRED EMBODIMENTS

The process of the invention is explained below by several illustrative examples; the results of example 1 are listed in the FIGURE of the drawing attached hereto and show the proportion of the elements present at the material surface as a function of depth.

EXAMPLE 1

In this example, the absorber is made of stainless steel sheet Z 8 C Nb 17 (AFNOR standard) [composition: 17% Cr, 0.08% C, 0.5% Nb, remainder iron].

The treatment bath is an aqueous solution of sulfuric acid with 18% by weight of acid and to which is added 0.1 gram of sulfur per liter in the form of sodium thiosulfate $Na_2S_2O_3.5H_2O$ and 1.43 g of propargyl alcohol (propyne 2 ol 1: $C_3H_4O$) per liter acting as the corrosion inhibitor.

The natural-corrosion potential of the alloy in such a bath is measured using a millivoltmeter electrically connected to the alloy and to a saturated calomel electrode; as regards the sheet of the present example, which was previously degreased using ethyl alcohol, the measured corrosion potential was $-0.5$ volts.

The primary passivation potential of this alloy in the bath was measured by using a potentiostat to plot the current/potential curve of the iron alloy in the bath (the function of the potentiostat being to apply to the anode consisting of the alloy a potential which was variable with respect to the saturated calomel electrode); the primary passivation potential corresponds to the activity peak in this case being $+0.7$ volts.

The natural-corrosion potential being less, the treatment could therefore be carried out directly; it consisted in keeping the alloy immersed in the ambient temperature bath for 5 minutes with stirring.

Following the treatment, the surface evinces a matte black appearance with excellent selectivity as shown by the absorptivities $\alpha_s$ (the overall absorbed radiation/the incident solar radiation) and the emissivities $\epsilon_{20}$ (overall absorbed radiation given off divided by that of the blackbody at 20° C.):

$\alpha_s = 0.92$;

$\epsilon_{20} = 0.13$.

Ion-probe microanalysis was performed on a surface sample; the curves of the single FIGURE of the drawing are recordings and illustrate the concentration profiles of the elements after migrations and reactions (there is no simple way to calibrate the coordinate axes).

The absorber was subject to an ageing test at 200° C. for 5,000 hours. After that time, no change at all in the optical properties could be noted. Again a dwell-time of 5,000 hours in water does not affect those properties.

EXAMPLE 2

In this example the absorber is made of stainless steel sheet Z 8 C Nb 17 (AFNOR standard) in the same manner as before.

The treatment bath is an aqueous solution of sulfuric acid with 1.8% by weight of acid to which is added 0.08 g of sulfur per liter in the form of sodium sulfide $Na_2S.9H_2O$ and 0.15 g of propargyl alcohol.

The natural-corrosion potential of the alloy in such a bath is measured in the same manner as before, following degreasing, and is +0.9 volts.

The primary passivation potential in this bath is measured as before and is found to be +0.7 volts.

Because the natural-corrosion potential is higher, the absorber is subjected to a prior cathode-activation to lower said potential. The absorber is placed in the bath and is connected to a current source so that it shall be the cathode, the other source terminal being connected to the anode.

The current is set up for about one minute at a density of about 1 ampere/dm².

The natural-corrosion potential is measured again and found to be −0.59 volts.

Thereupon the treatment is carried out keeping the alloy immersed in the bath for 15 minutes at ambient temperature and stirring the bath.

A matte black surface is obtained with the following absorptivity $\alpha_s$ and emissivity $\epsilon_{20}$:

$\alpha_s = 0.90$ $\epsilon_{20} = 0.15$.

This sample is raised to 300° C. for 4,000 h at ambient pressure. At the end of this test, the absorptivity $\alpha_s$ has risen to 0.92 and the emissivity $\epsilon_{20}$ is unchanged. These remarkable results permit the use of such an absorber for solar collector with semi-focused beams, whether exposed to air or not.

EXAMPLE 3

In this example, the absorber is made of stainless steel sheet Z2 CN 18-10 (composition: 18% chromium, 10% nickel, 0.02% carbon and remaining percentage iron).

The bath composition is as follows:
sulfuric acid: 1.83%
selenium: 0.158 g/l in the form of selenium dioxide ($SeO_2$).

Following surface degreasing and pickling in a chloronitric bath, the potentials are measured as follows:
Natural corrosion potential: −0.40 volts
Primary passivation potential: −0.15 volts.

The treatment is started with no need for activation; it lasts 30 minutes with bath agitation.

The following results are obtained:

$\alpha_s = 0.90$ $\epsilon_{20} = 0.15$.

EXAMPLE 4

In this example, the absorber is made of stainless steel sheet Z8 C Nb 17 (AFNOR standard).

The composition of the treatment bath is as follows:
sulfuric acid: 18% by weight
sulfur: 0.39 g/l in the form of sodium thiosulfate $Na_2S_2O_3.5H_2O$,
inhibitor: 3-methyl, 1-pentene, 3-ol $C_6H_{12}O$ in percent of 5 g/l.

The measured natural corrosion potential is +0.6 volts; the primary passivation potential was not measured in this case but was estimated to be approximately of the same magnitude and it appeared necessary to perform a cathode activation under the same conditions as in example 2.

Following activation the natural corrosion potential is 0.5 volts.

Thereupon the treatment was undertaken for 10 minutes with bath agitation. In this case the treatment was carried out by raising the bath temperature to 30° C.

Following treatment, the optical properties are as follows:

$\alpha_s = 0.90$;

$\epsilon_{20} = 0.19$

EXAMPLE 5

In this example the absorber is made of stainless steel Z8 C13 (AFNOR standard), being composed of 13% chromium, 0.08% carbon, the remaining percentage being iron.

Composition of the treatment bath:
sulfuric acid: 1.83%
sulfur: 0.026 g/l in the form of sodium sulfide $Na_2S.9H_2O$
propargyl alcohol: 0.5 g/l.

The surface is abraded and polished with 600 sandpaper (the number of grains per cm²). Thereupon the potentials are measured:
natural corrosion potential: −0.6 volts
primary passivation potential: +0.4 volts.
Treatment: for 10 minutes with bath agitation.
Results:

$\alpha_s = 0.91$;

$\epsilon_{20} = 0.12$.

An ageing test in water for 1,000 h was carried out. The parameters $\alpha_s$ and $\epsilon_{20}$ did not change significantly. The exceptionally low emissivity—which remains in the presence of water—is hereby stressed.

EXAMPLE 6

In this example, the absorber is made of titanium-stabilized ferrite stainless steel Z8 C 18 T (composition:

18% chromium, 0.08% carbon, 0.5% titanium, the remaining percentage being iron).

Composition of treatment bath:
sulfuric acid: 9.3% by weight
sulfur: 0.77 g/l in the form of hydrated thiosulfate
propargyl alcohol: 1.9 g/l
Measured potentials:
natural corrosion potential: +0.4 volts
primary passivation potential: +0.3 volts.

As the natural corrosion potential is higher, prior cathode activation is carried out under the same conditions as in Example 2.

Thereupon the natural corrosion potential was set at about −0.5 volts.

Next the treatment was performed for 12 minutes with bath agitation.
Results:

$a_s = 0.91$ $\epsilon_{20} = 0.16$

EXAMPLE 7

Alloy: stainless steel Z8 CNb 17
Bath composition:
sulfuric acid: 5.58%
sulfur: 0.07 g/l in the form of hydrated sodium sulfate
propargyl alcohol: 0.14 g/l The treatment was carried out following cathode activation under the same conditions as in Example 2 to reduce the natural corrosion potential to a negative value less than the primary passivation potential.

Time of treatment: 30 minutes, with bath agitation.
Results:

$a_s = 0.84$;

$\epsilon_{20} = 0.16$.

Thereupon the surface so obtained is placed in a vacuum ($10^{-4}$ torr) at +400° C. for 1 h 30, simulating the conditions of manufacture of vacuum-operated collectors.

At the end of this test, the absorptivity $a_s$ has increased to 0.90, while the emissivity $\epsilon_{20}$ is unchanged.

EXAMPLE 8

Alloy: stainless steel Z8 C Nb 17
Bath composition:
sulfuric acid: 18.3% by weight
sulfur: 0.1 g/l in the form of sodium thiosulfate
propargyl alcohol: 7 g/l
temperature: 45° C.

Under these conditions, in particular the bath temperature, the natural corrosion potential is less than the primary passivation potential.

Natural corrosion potential: −0.5 volts
Primary passivation potential: +0.1 volts.
Treatment time: 8 minutes
Results:

$a_s = 0.97$;

$\epsilon_{20} = 0.20$

Be it noted that the slight rise in temperature results in very high absorptivity $a_s$, while the emissivity $\epsilon_{20}$ remains relatively low.

EXAMPLE 9

In this example, the absorber is made of a stainless steel sheet Z8 CT 17 (Composition: 17% chromium, 0.08% carbon, 0.5% titanium).

Upon treatment per example 8, the results are:

$a_s = 0.96$ $\epsilon_{20} = 0.22$

EXAMPLE 10

Alloy: Z8 C Nb 17
Bath composition:
sulfuric acid: 15% by weight
sulfur: 0.1 g/l in the form of sodium thiosulfate
alcohol: butyne 3-ol-2 3 g/l ($C_4H_6O$)
Temperature: 45° C.
Natural corrosion potential: −0.5 volts
Primary passivation potential: +0.1 volts
Results:

$a_s = 0.95$;

$\epsilon_{20} = 0.20$.

Be it noted that as regards the examples 1, 2, 3, 5, 6 and 7, the process was implemented at ambient temperatures (about 20° C.).

I claim:

1. A process for making a selective absorber for a solar collector for obtaining a collector surface for solar radiation having high absorptivity and low emissivity comprising providing a collector surface of iron containing chromium alloyed therewith, providing an acid bath containing oxygen atoms and at least one metalloid substance based on sulfur, selenium and/or tellurium dissolved in said bath, adjusting the state of the collector surface so that the natural corrosion potential of the collector surface in the presence of said bath is less than the primary passivation potential for raising the surface to the active state, and contacting said collector surface with said bath so as to cause migration of the metal atoms from the collector and to cause migration of the metalloid atoms from the bath and to thereby bring about interface reactions between said metal atoms and said metalloid atoms at the surface of said collector.

2. A process according to claim 1, and including adding to said bath a corrosion inhibitor specific to the alloy and the bath containing the metalloid substance.

3. A process according to claim 2, and wherein said corrosion inhibitor added to the bath is selected from the group consisting of acetylenic alcohols and ethylenic alcohols.

4. A process as in one of claims 1, 2 or 3, and including adjusting the natural corrosion potential of the alloy by measuring said natural corrosion potential using a test circuit comprising an electrode comprising the collector surface and a reference electrode immersed in the bath, and carrying out a cathode activation by immersing an anode into the bath and setting up a current between said anode and the collector surface as the cathode, and repeating said cathode activation until the measured natural corrosion potential is less than the primary passivation potential.

5. A process according to claim 4 and including adjusting the natural corrosion potential of the alloy by previously pickling and/or abrading and/or degreasing the collector surface before prior to said cathode activation.

6. A process according to claim 1, 2 or 3 characterized in that said bath comprises an aqueous bath.

7. A process according to claim 1, 2 or 3 characterized in that the metalloid substance comprises a sulfur-based substance selected from the group consisting of sulfur or thiosulfate.

8. A process according to claim 1, 2 or 3 characterized in that the metalloid substance comprises a selenium-based substance selected from the group consisting of selenium dioxide and selenous acid.

9. A process according to claim 1, 2 or 3 characterized in that said acid bath contains at least 0.1% by weight of acid.

10. A process according to claim 1, 2 or 3 characterized in that the collector surface comprises a ferrite steel containing chromium and stabilized by niobium or titanium.

11. A process according to claim 1, 2 or 3 characterized in that the collector surface comprises austenite steel containing chromium and nickel.

* * * * *